US007945214B2

(12) United States Patent
Kim et al.

(10) Patent No.: US 7,945,214 B2
(45) Date of Patent: May 17, 2011

(54) METHOD OF REDUCING OVERHEAD FOR MULTI-INPUT, MULTI-OUTPUT TRANSMISSION SYSTEM

(75) Inventors: Sang Gook Kim, San Diego, CA (US); Young Cheul Yoon, San Diego, CA (US); Li-Hsiang Sun, San Diego, CA (US); Suk Woo Lee, San Diego, CA (US); Ho Bin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 927 days.

(21) Appl. No.: 11/691,403

(22) Filed: Mar. 26, 2007

(65) Prior Publication Data
US 2007/0270108 A1 Nov. 22, 2007

Related U.S. Application Data

(60) Provisional application No. 60/785,419, filed on Mar. 24, 2006, provisional application No. 60/786,471, filed on Mar. 27, 2006.

(51) Int. Cl.
*H04B 1/00* (2006.01)
*H04B 7/00* (2006.01)
(52) U.S. Cl. ........ 455/69; 455/101; 455/103; 455/562.1
(58) Field of Classification Search .................. 455/69, 455/101, 562.1, 103–105
See application file for complete search history.

(56) References Cited

U.S. PATENT DOCUMENTS

| 6,600,934 | B1* | 7/2003 | Yun et al. .................... 455/562.1 |
| 7,369,511 | B2* | 5/2008 | Utsunomiya et al. ......... 370/252 |
| 7,450,489 | B2* | 11/2008 | Sandhu ......................... 370/204 |
| 7,583,939 | B2* | 9/2009 | Mehta et al. .................... 455/91 |
| 7,643,570 | B2* | 1/2010 | Seki .............................. 375/267 |
| 2003/0012174 | A1* | 1/2003 | Bender et al. .................. 370/347 |
| 2005/0013381 | A1* | 1/2005 | Suh et al. ........................ 375/260 |
| 2005/0141407 | A1* | 6/2005 | Sandhu ......................... 370/203 |
| 2005/0153723 | A1 | 7/2005 | Hosur et al. |
| 2005/0181728 | A1 | 8/2005 | Hansen et al. |
| 2005/0286474 | A1 | 12/2005 | Van Zelst |
| 2006/0002487 | A1 | 1/2006 | Kriedte et al. |
| 2007/0165576 | A1* | 7/2007 | Wang et al. ..................... 370/335 |
| 2007/0183515 | A1* | 8/2007 | Lim et al. ........................ 375/260 |
| 2007/0263734 | A1* | 11/2007 | Seki .............................. 375/259 |
| 2008/0051037 | A1* | 2/2008 | Molnar et al. ................... 455/70 |
| 2009/0129501 | A1* | 5/2009 | Mehta et al. ..................... 375/299 |
| 2010/0185777 | A1* | 7/2010 | Kim et al. ....................... 709/231 |

OTHER PUBLICATIONS

Sumeet Sandhu et al., "Near-Optimal Selection of Transmit Antennas for a MIMO Channel Based on Shannon Capacity," IEEE Conference on Signals, Systems and Computers, vol. 1, pp. 567-571, 2000.

* cited by examiner

*Primary Examiner* — Edward Urban
*Assistant Examiner* — RuiMeng Hu
(74) *Attorney, Agent, or Firm* — Lee, Hong, Degerman, kang & Waimey

(57) ABSTRACT

A method of transmitting data in a multi input, multi output (MIMO) system is disclosed. More specifically, the method includes selecting a primary antenna, based on satisfying at least one specified criteria, for transmitting a preamble, and transmitting the preamble via the primary antenna.

10 Claims, 17 Drawing Sheets

CDMA SPREADING AND DESPREADING

CDMA SPREADING AND DESPREADING USING MULTIPLE SPREADING SEQUENCES

CDMA 2000 CALL PROCESSING OVERVIEW

CDMA 2000 INITIALIZATION STATE

SYSTEM ACCESS STATE

FIG. 7
COMPARISON OF CDMA2000 FOR 1x AND 1xEV-DO
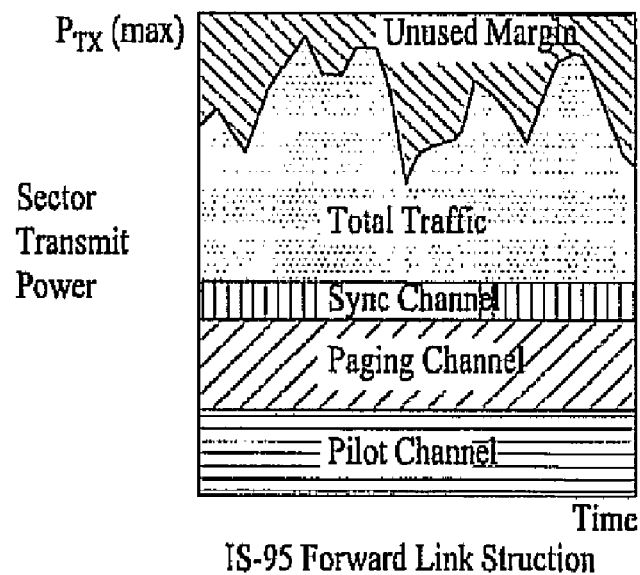
IS-95 Forward Link Struction
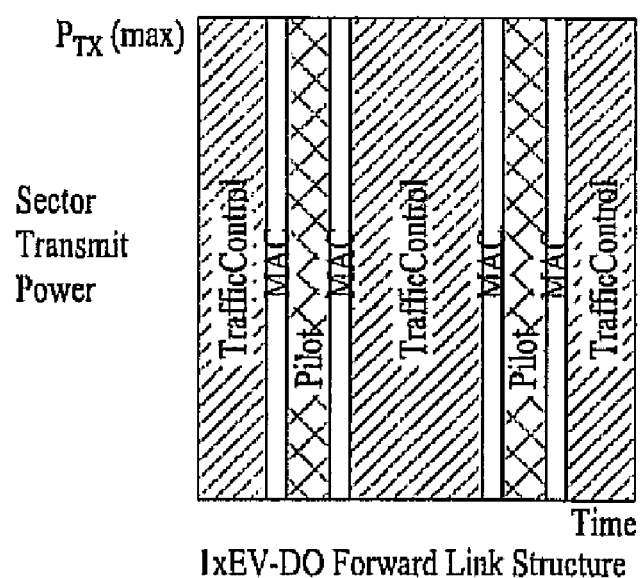
1xEV-DO Forward Link Structure 1xEV-DO NETWORK ARCHITECTURE 1xEV-DO DEFAULT PROTOCOL 1xEV-DO NON-DEFAULT PROTOCOL 1xEV-DO CONNECTION LAYER PROTOCOLS FIG. 17
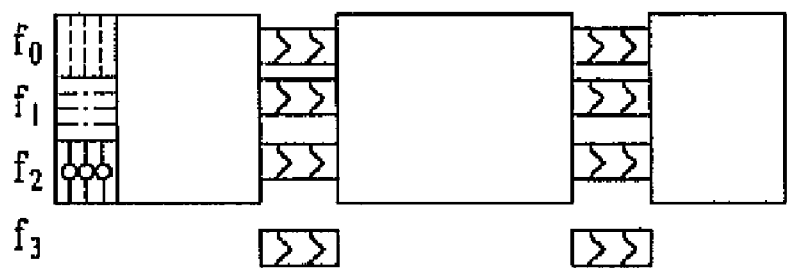
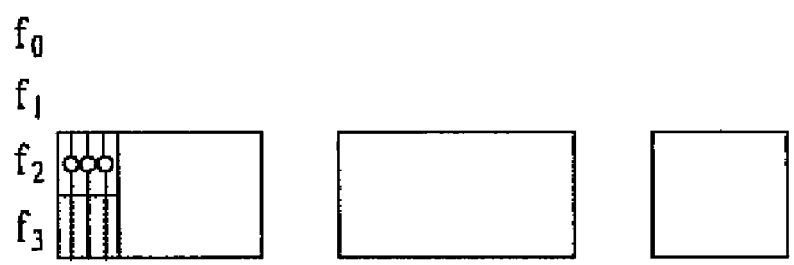
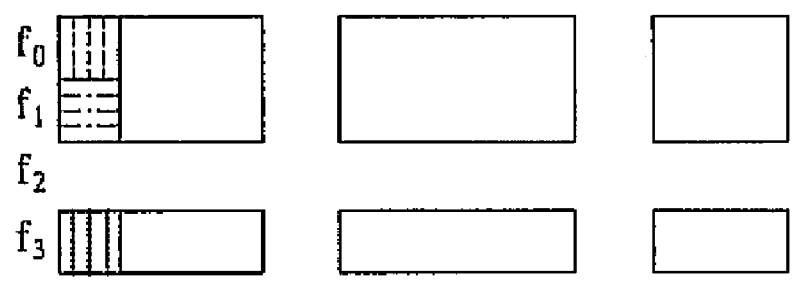
▥ ▤ ▦ ▥ Preamble &
☐ OFDM Data   ▧ Overhead (MAC&Pilot)

METHOD OF REDUCING OVERHEAD FOR MULTI-INPUT, MULTI-OUTPUT TRANSMISSION SYSTEM

This application claims the benefit of U.S. Provisional Application No. 60/785,419, filed on Mar. 24, 2006, and U.S. Provisional Application No. 60/786,471, filed on Mar. 27, 2006, all of which are hereby incorporated by reference.

BACKGROUND OF THE INVENTION

1. Field of the Invention

The present invention relates to a method of reducing overhead, and more particularly, to a method of reducing overhead for multi-input, multi-output (MIMO) transmission system.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

In a wireless communication system, it is important to devise schemes and techniques that increase the information rate and improve the robustness of a communication system under the harsh conditions of the wireless environment. To combat less-than-ideal communication conditions and/or to improve communication, various methods, including reducing transmission of unnecessary data, can be used to free up resources as well as promote more effective and efficient transmission.

SUMMARY OF THE INVENTION

Accordingly, the present invention is directed to a method of reducing overhead for multi-input, multi-output (MIMO) transmission system that substantially obviates one or more problems due to limitations and disadvantages of the related art.

An object of the present invention is to provide a method of transmitting data in a multi input, multi output (MIMO) system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting data in a multi input, multi output (MIMO) system includes selecting a primary antenna, based on satisfying at least one specified criteria, for transmitting a preamble, and transmitting the preamble via the primary antenna.

In another aspect of the present invention, a method of transmitting data in a multi input, multi output (MIMO) system includes selecting an antenna from a plurality of transmission antennas as a primary antenna based on the antenna having the best channel condition or a smallest index from the plurality of transmission antennas for transmitting at least one preamble, and transmitting at least one of the preamble and the data via the primary antenna.

In a further aspect of the present invention, a method of transmitting data in a multi input, multi output (MIMO) system includes selecting an antenna from a plurality of transmission antennas as a primary antenna based on the antenna having the best channel condition or a smallest index from the plurality of transmission antennas for transmitting at least one preamble, and transmitting at least one of the preamble and the data via the primary antenna.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 7 illustrates a comparison of cdma2000 for a 1x system and a 1xEV-DO system;

FIG. 17 is another exemplary diagram illustrating transmission of preamble and OFDM data.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
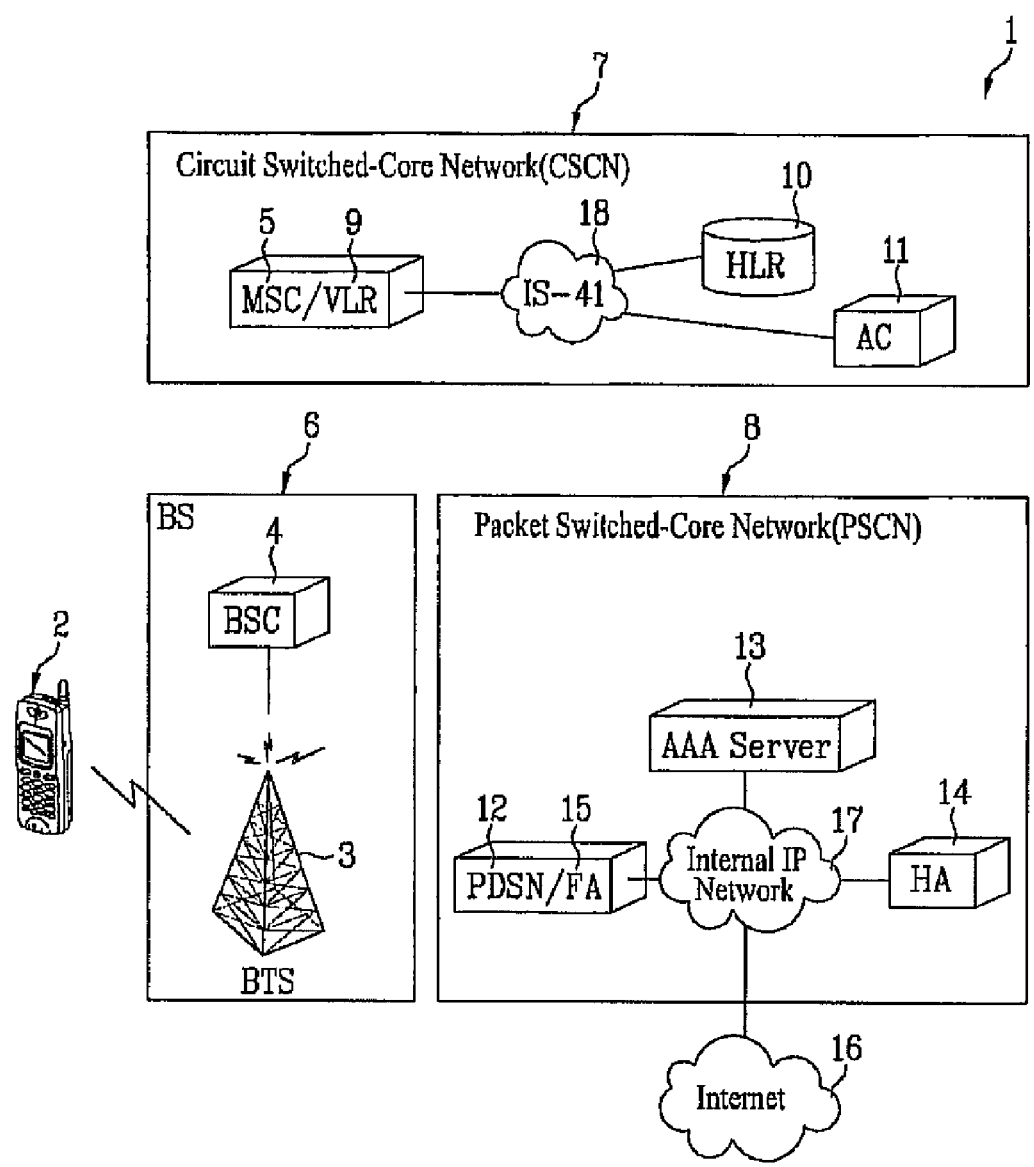
FIG. 1 illustrates wireless communication network architecture.

Referring to FIG. 1, a wireless communication network architecture is illustrated. A subscriber uses a mobile station (MS) 2 to access network services. The MS 2 may be a portable communications unit, such as a hand-held cellular phone, a communication unit installed in a vehicle, or a fixed-location communications unit.

The electromagnetic waves for the MS 2 are transmitted by the Base Transceiver System (BTS) 3 also known as node B. The BTS 3 consists of radio devices such as antennas and equipment for transmitting and receiving radio waves The BS 6 Controller (BSC) 4 receives the transmissions from one or more BTS's. The BSC 4 provides control and management of the radio transmissions from each BTS 3 by exchanging messages with the BTS and the Mobile Switching Center (MSC) 5 or Internal IP Network. The BTS's 3 and BSC 4 are part of the BS 6 (BS) 6.

The BS 6 exchanges messages with and transmits data to a Circuit Switched Core Network (CSCN) 7 and Packet Switched Core Network (PSCN) 8. The CSCN 7 provides traditional voice communications and the PSCN 8 provides Internet applications and multimedia services.

The Mobile Switching Center (MSC) 5 portion of the CSCN 7 provides switching for traditional voice communications to and from a MS 2 and may store information to support these capabilities. The MSC 2 may be connected to one of more BS's 6 as well as other public networks, for example a Public Switched Telephone Network (PSTN) (not shown) or Integrated Services Digital Network (ISDN) (not shown). A Visitor Location Register (VLR) 9 is used to retrieve information for handling voice communications to or from a visiting subscriber. The VLR 9 may be within the MSC 5 and may serve more than one MSC.

A user identity is assigned to the Home Location Register (HLR) 10 of the CSCN 7 for record purposes such as subscriber information, for example Electronic Serial Number (ESN), Mobile Directory Number (MDR), Profile Information, Current Location, and Authentication Period. The Authentication Center (AC) 11 manages authentication information related to the MS 2. The AC 11 may be within the HLR 10 and may serve more than one HLR. The interface between the MSC 5 and the HLR/AC 10, 11 is an IS-41 standard interface 18.

The Packet data Serving Node (PDSN) 12 portion of the PSCN 8 provides routing for packet data traffic to and from MS 2. The PDSN 12 establishes, maintains, and terminates link layer sessions to the MS 2's 2 and may interface with one of more BS 6 and one of more PSCN 8.

The Authentication, Authorization and Accounting (AAA) 13 Server provides Internet Protocol authentication, authorization and accounting functions related to packet data traffic. The Home Agent (HA) 14 provides authentication of MS 2 IP registrations, redirects packet data to and from the Foreign Agent (FA) 15 component of the PDSN 8, and receives provisioning information for users from the AAA 13. The HA 14 may also establish, maintain, and terminate secure communications to the PDSN 12 and assign a dynamic IP address. The PDSN 12 communicates with the AAA 13, HA 14 and the Internet 16 via an Internal IP Network.

There are several types of multiple access schemes, specifically Frequency Division Multiple Access (FDMA), Time Division Multiple Access (TDMA) and Code Division Multiple Access (CDMA). In FDMA, user communications are separated by frequency, for example, by using 30 KHz channels. In TDMA, user communications are separated by frequency and time, for example, by using 30 KHz channels with 6 timeslots. In CDMA, user communications are separated by digital code.

In CDMA, All users on the same spectrum, for example, 1.25 MHz. Each user has a unique digital code identifier and the digital codes separate users to prevent interference.

A CDMA signal uses many chips to convey a single bit of information. Each user has a unique chip pattern, which is essentially a code channel. In order to recover a bit, a large number of chips are integrated according to a user's known chip pattern. Other user's code patterns appear random and are integrated in a self-canceling manner and, therefore, do not disturb the bit decoding decisions made according to the user's proper code pattern.

Figure 2A:
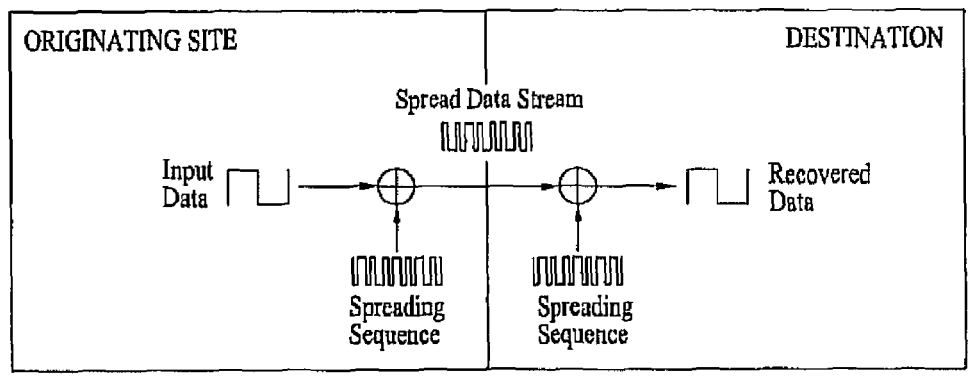
FIG. 2A illustrates a CDMA spreading and de-spreading process.
Figure 2B:
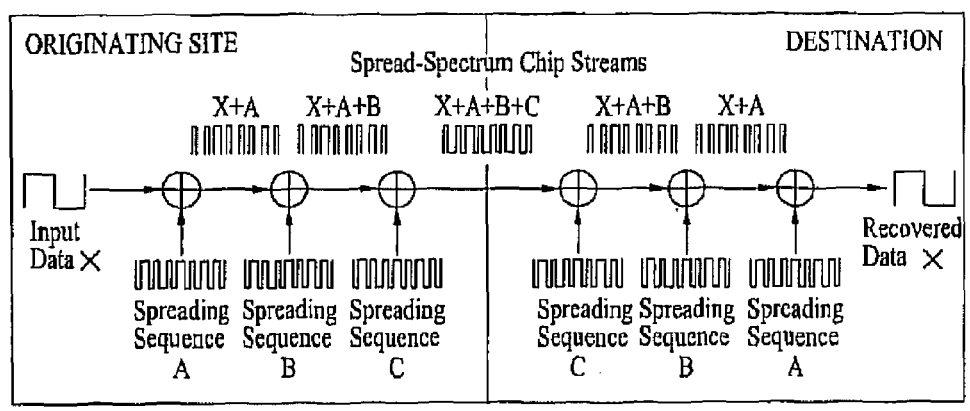
FIG. 2B illustrates a CDMA spreading and de-spreading process using multiple spreading sequences.

Input data is combined with a fast spreading sequence and transmitted as a spread data stream. A receiver uses the same spreading sequence to extract the original data. FIG. 2A illustrates the spreading and de-spreading process. As illustrated in FIG. 2B, multiple spreading sequences may be combined to create unique, robust channels.

A Walsh code is one type of spreading sequence. Each Walsh code is 64 chips long and is precisely orthogonal to all other Walsh codes. The codes are simple to generate and small enough to be stored in read only memory (ROM).

A short PN code is another type of spreading sequence. A short PN code consists of two PN sequences (I and Q), each of which is 32,768 chips long and is generated in similar, but differently tapped 15-bit shift registers. The two sequences scramble the information on the I and Q phase channels.

A long PN code is another type of spreading sequence. A long PN code is generated in a 42-bit register and is more than 40 days long, or about $4 \times 10^{13}$ chips long. Due to its length, a long PN code cannot be stored in ROM in a terminal and, therefore, is generated chip-by-chip.

Each MS 2 codes its signal with the PN long code and a unique offset, or public long code mask, computed using the long PN code ESN of 32-bits and 10 bits set by the system. The public long code mask produces a unique shift. Private long code masks may be used to enhance privacy. When integrated over as short a period as 64 chips, MS 2 with different long PN code offsets will appear practically orthogonal.

CDMA communication uses forward channels and reverse channels. A forward channel is utilized for signals from a BTS 3 to a MS 2 and a reverse channel is utilized for signals from a MS to a BTS.

A forward channel uses its specific assigned Walsh code and a specific PN offset for a sector, with one user able to have multiple channel types at the same time. A forward channel is identified by its CDMA RF carrier frequency, the unique short code PN offset of the sector and the unique Walsh code of the user. CDMA forward channels include a pilot channel, sync channel, paging channels and traffic channels.

The pilot channel is a "structural beacon" which does not contain a character stream, but rather is a timing sequence used for system acquisition and as a measurement device during handoffs. A pilot channel uses Walsh code 0.

The sync channel carries a data stream of system identification and parameter information used by MS 2 during system acquisition. A sync channel uses Walsh code 32.

There may be from one to seven paging channels according to capacity requirements. Paging channels carry pages, system parameter information and call setup orders. Paging channels use Walsh codes 1-7.

The traffic channels are assigned to individual users to carry call traffic. Traffic channels use any remaining Walsh codes subject to overall capacity as limited by noise.

A reverse channel is utilized for signals from a MS 2 to a BTS 3 and uses a Walsh code and offset of the long PN sequence specific to the MS, with one user able to transmit multiple types of channels simultaneously. A reverse channel is identified by its CDMA RF carrier frequency and the unique long code PN Offset of the individual MS 2. Reverse channels include traffic channels and access channels.

Individual users use traffic channels during actual calls to transmit traffic to the BTS 3. A reverse traffic channel is basically a user-specific public or private long code Mask and there are as many reverse traffic channels as there are CDMA terminals.

An MS 2 not yet involved in a call uses access channels to transmit registration requests, call setup requests, page responses, order responses and other signaling information. An access channel is basically a public long code offset unique to a BTS 3 sector. Access channels are paired with paging channels, with each paging channel having up to 32 access channels.

CDMA communication provides many advantages. Some of the advantages are variable rate vocoding and multiplexing, power control, use of RAKE receivers and soft handoff.

CDMA allows the use of variable rate vocoders to compress speech, reduce bit rate and greatly increase capacity. Variable rate vocoding provides full bit rate during speech, low data rates during speech pauses, increased capacity and natural sound. Multiplexing allows voice, signaling and user secondary data to be mixed in CDMA frames.

By utilizing forward power control, the BTS 3 continually reduces the strength of each user's forward baseband chip stream. When a particular MS 2 experiences errors on the forward link, more energy is requested and a quick boost of energy is supplied after which the energy is again reduced.

Using a RAKE receiver allows a MS 2 to use the combined outputs of the three traffic correlators, or "RAKE fingers," every frame. Each RAKE finger can independently recover a particular PN Offset and Walsh code. The fingers may be targeted on delayed multipath reflections of different BTS's 3, with a searcher continuously checking pilot signals.

The MS 2 drives soft handoff. The MS 2 continuously checks available pilot signals and reports to the BTS 3 regarding the pilot signals it currently sees. The BTS 3 assigns up to a maximum of six sectors and the MS 2 assigns its fingers accordingly. Al messages are sent by dim-and-burst without muting. Each end of the communication link chooses the best configuration on a frame-by-frame basis, with handoff transparent to users.

A cdma2000 system is a third-generation (3G) wideband; spread spectrum radio interface system that uses the enhanced service potential of CDMA technology to facilitate data capabilities, such as Internet and intranet access, multimedia applications, high-speed business transactions, and telemetry. The focus of cdma2000, as is that of other third-generation systems, is on network economy and radio transmission design to overcome the limitations of a finite amount of radio spectrum availability.

Figure 3:
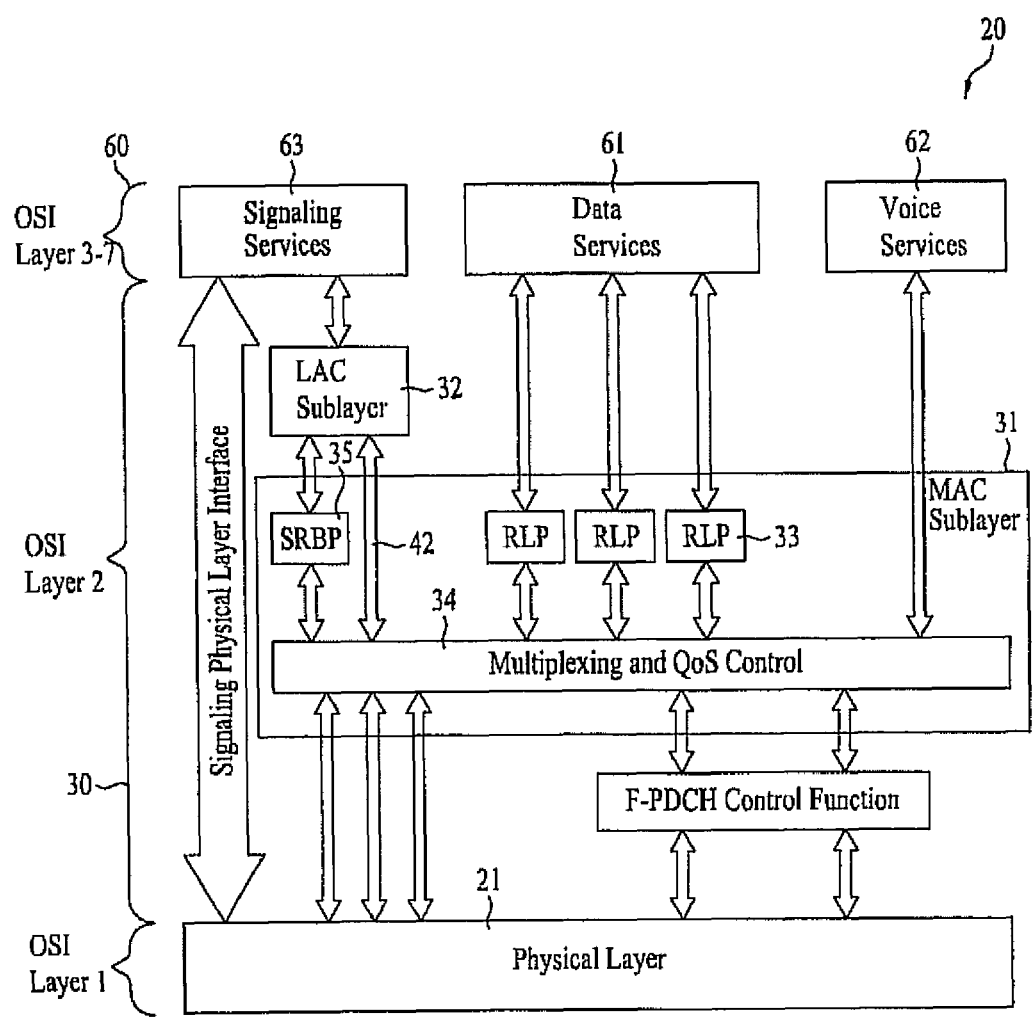
FIG. 3 illustrates a data link protocol architecture layer for a cdma2000 wireless network.

FIG. 3 illustrates a data link protocol architecture layer 20 for a cdma2000 wireless network. The data link protocol architecture layer 20 includes an Upper Layer 60, a Link Layer 30 and a Physical layer 21.

The Upper layer 60 includes three sublayers; a Data Services sublayer 61; a Voice Services sublayer 62 and a Signaling Services sublayer 63. Data services 61 are services that deliver any form of data on behalf of a mobile end user and include packet data applications such as IP service, circuit data applications such as asynchronous fax and B-ISDN emulation services, and SMS. Voice services 62 include PSTN access, mobile-to-mobile voice services, and Internet telephony. Signaling 63 controls all aspects of mobile operation.

The Signaling Services sublayer 63 processes all messages exchanged between the MS 2 and BS 6. These messages control such functions as call setup and teardown, handoffs, feature activation, system configuration, registration and authentication.

The Link Layer 30 is subdivided into the Link Access Control (LAC) sublayer 32 and the Medium Access Control (MAC) sublayer 3I. The Link Layer 30 provides protocol support and control mechanisms for data transport services and performs the functions necessary to map the data transport needs of the Upper layer 60 into specific capabilities and characteristics of the Physical Layer 21. The Link Layer 30 may be viewed as an interface between the Upper Layer 60 and the Physical Layer 20.

The separation of MAC 31 and LAC 32 sublayers is motivated by the need to support a wide range of Upper Layer 60 services and the requirement to provide for high efficiency and low latency data services over a wide performance range, specifically from 1.2 Kbps to greater than 2 Mbps. Other motivators are the need for supporting high Quality of Service (QoS) delivery of circuit and packet data services, such as limitations on acceptable delays and/or data BER (bit error rate), and the growing demand for advanced multimedia services each service having a different QoS requirements.

The LAC sublayer 32 is required to provide a reliable, in-sequence delivery transmission control function over a point-to-point radio transmission link 42. The LAC sublayer 32 manages point-to point communication channels between upper layer 60 entities and provides framework to support a wide range of different end-to-end reliable Link Layer 30 protocols.

The Link Access Control (LAC) sublayer 32 provides correct delivery of signaling messages. Functions include assured delivery where acknowledgement is required, unassured delivery where no acknowledgement is required, duplicate message detection, address control to deliver a message to an individual MS 2, segmentation of messages into suitable sized fragments for transfer over the physical medium, reassembly and validation of received messages and global challenge authentication.

The MAC sublayer 31 facilitates complex multimedia, multi-services capabilities of 3G wireless systems with QoS management capabilities for each active service. The MAC sublayer 31 provides procedures for controlling the access of packet data and circuit data services to the Physical Layer 21, including the contention control between multiple services from a single user, as well as between competing users in the wireless system. The MAC sublayer 31 also performs mapping between logical channels and physical channels, multiplexes data from multiple sources onto single physical channels and provides for reasonably reliable transmission over the Radio Link Layer using a Radio Link Protocol (RLP) 33 for a best-effort level of reliability. Signaling Radio Burst Protocol (SRBP) 35 is an entity that provides connectionless protocol for signaling messages. Multiplexing and QoS Control 34 is responsible for enforcement of negotiated QoS levels by mediating conflicting requests from competing services and the appropriate prioritization of access requests.

The Physical Layer 20 is responsible for coding and modulation of data transmitted over the air. The Physical Layer 20 conditions digital data from the higher layers so that the data may be transmitted over a mobile radio channel reliably.

The Physical Layer 20 maps user data and signaling, which the MAC sublayer 31 delivers over multiple transport channels, into a physical channels and transmits the information over the radio interface. In the transmit direction, the functions performed by the Physical Layer 20 include channel coding, interleaving, scrambling, spreading and modulation. In the receive direction, the functions are reversed in order to recover the transmitted data at the receiver.

Figure 4:
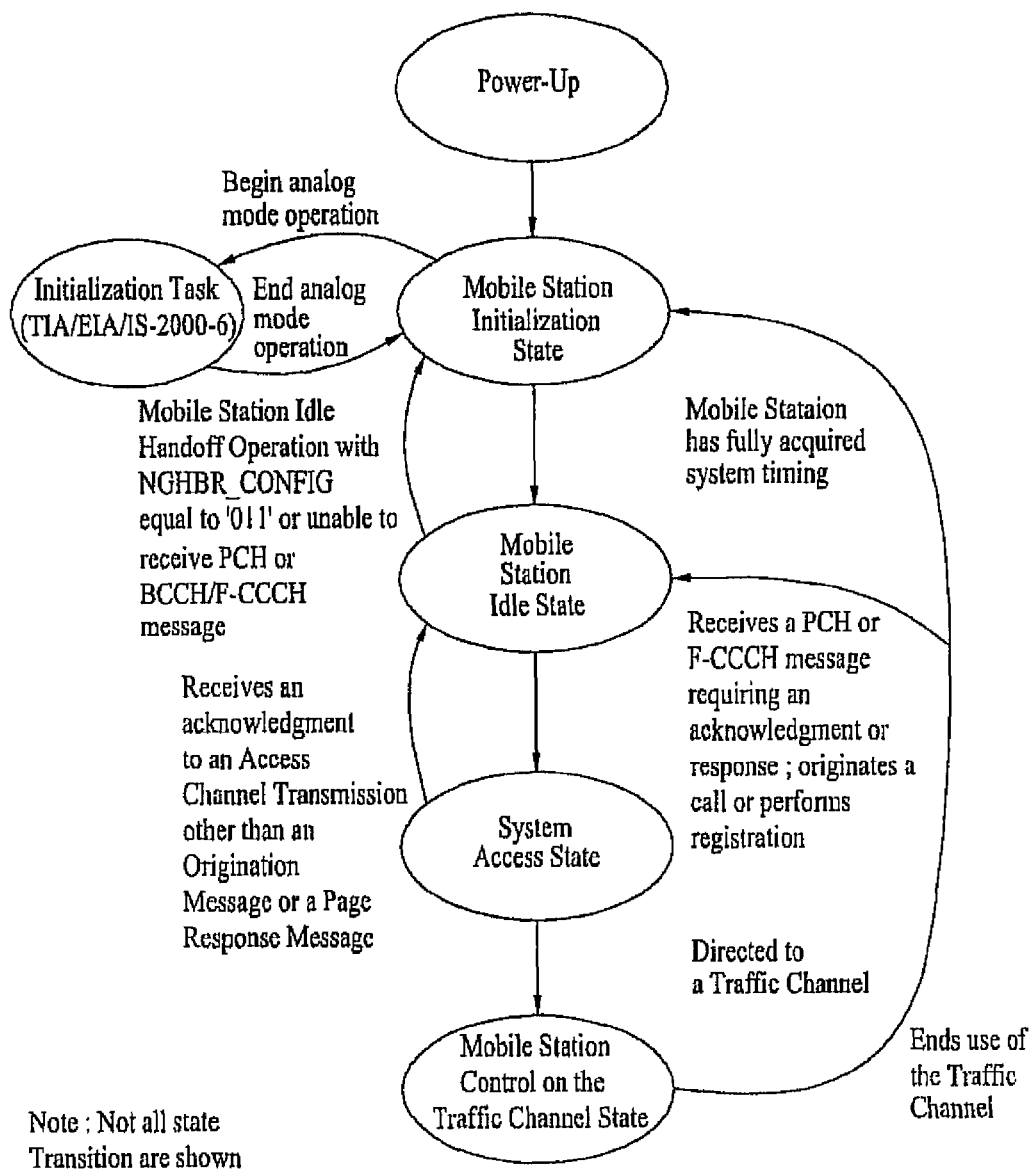
FIG. 4 illustrates cdma2000 call processing.

FIG. 4 illustrates an overview of call processing. Processing a call includes pilot and sync channel processing, paging channel processing, access channel processing and traffic channel processing.

Pilot and sync channel processing refers to the MS 2 processing the pilot and sync channels to acquire and synchronize with the CDMA system in the MS 2 Initialization State. Paging channel processing refers to the MS 2 monitoring the paging channel or the forward common control channel (F-CCCH) to receive overhead and mobile-directed messages from the BS 6 in the Idle State. Access channel processing refers to the MS 2 sending messages to the BS 6 on the access channel or the Enhanced access channel in the System Access State, with the BS 6 always listening to these channels and responding to the MS on either a paging channel or the F-CCCH. Traffic channel processing refers to the BS 6 and MS 2 communicating using dedicated forward and reverse traffic channels in the MS 2 Control on Traffic Channel State, with the dedicated forward and reverse traffic channels carrying user information, such as voice and data.

Figure 5:
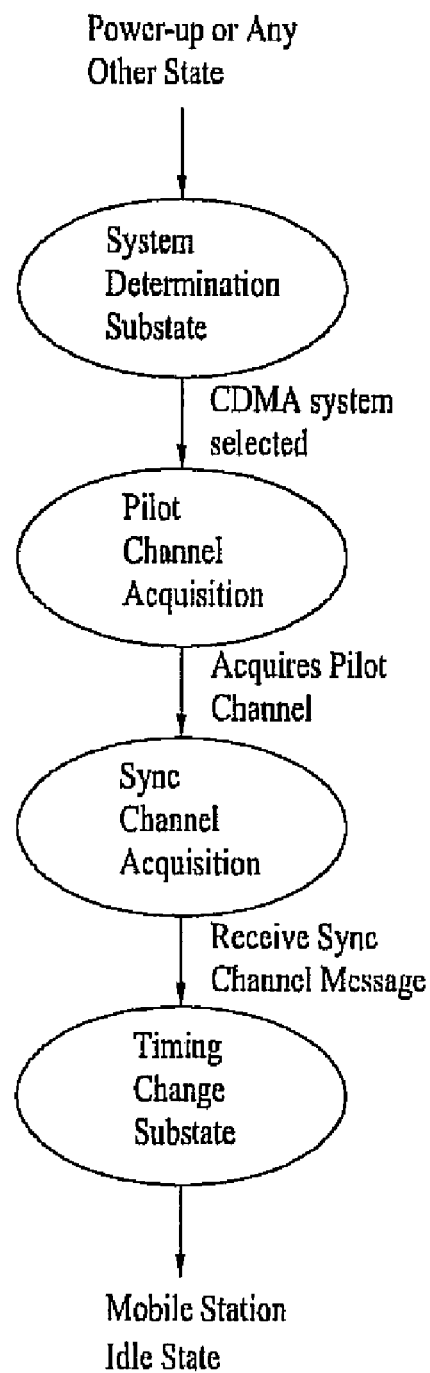
FIG. 5 illustrates the cdma2000 initialization state.

FIG. 5 illustrates the initialization state of a MS 2. The Initialization state includes a System Determination Substate, Pilot Channel Acquisition, Sync Channel Acquisition, a Timing Change Substate and a Mobile Station Idle State.

System Determination is a process by which the MS 2 decides from which system to obtain service. The process could include decisions such as analog versus digital, cellular versus PCS, and A carrier versus B carrier. A custom selection process may control System Determination. A service provider using a redirection process may also control System determination. After the MS 2 selects a system, it must determine on which channel within that system to search for service. Generally the MS 2 uses a prioritized channel list to select the channel.

Pilot Channel Processing is a process whereby the MS 2 first gains information regarding system timing by searching for usable pilot signals. Pilot channels contain no information, but the MS 2 can align its own timing by correlating with the pilot channel. Once this correlation is completed, the MS 2 is synchronized with the sync channel and can read a sync channel message to further refine its timing. The MS 2 is permitted to search up to 15 seconds on a single pilot channel before it declares failure and returns to System Determination to select either another channel or another system. The searching procedure is not standardized, with the time to acquire the system depending on implementation.

In cdma2000, there may be many pilot channels, such as OTD pilot, STS pilot and Auxiliary pilot, on a single channel. During System Acquisition, the MS 2 will not find any of these pilot channels because they are use different Walsh codes and the MS is only searching for Walsh 0.

The sync channel message is continuously transmitted on the sync channel and provides the MS 2 with the information to refine timing and read a paging channel. The mobile receives information from the BS 6 in the sync channel message that allows it to determine whether or not it will be able to communicate with that BS.

In the Idle State, the MS 2 receives one of the paging channels and processes the messages on that channel. Overhead or configuration messages are compared to stored sequence numbers to ensure the MS 2 has the most current parameters. Messages to the MS 2 are checked to determine the intended subscriber.

The BS 6 may support multiple paging channels and/or multiple CDMA channels (frequencies). The MS 2 uses a hash function based on its IMSI to determine which channel and frequency to monitor in the Idle State. The BS 6 uses the same hash function to determine which channel and frequency to use when paging the MS 2.

Using a Slot Cycle Index (SCI) on the paging channel and on F-CCCH supports slotted paging. The main purpose of slotted paging is to conserve battery power in MS 2. Both the MS 2 and BS 6 agree in which slots the MS will be paged. The MS 2 can power down some of its processing circuitry during unassigned slots. Either the General Page message or the Universal Page message may be used to page the mobile on F-CCCH. A Quick paging channel that allows the MS 2 to power up for a shorter period of time than is possible using only slotted paging on F-PCH or F-CCCH is also supported.

Figure 6:
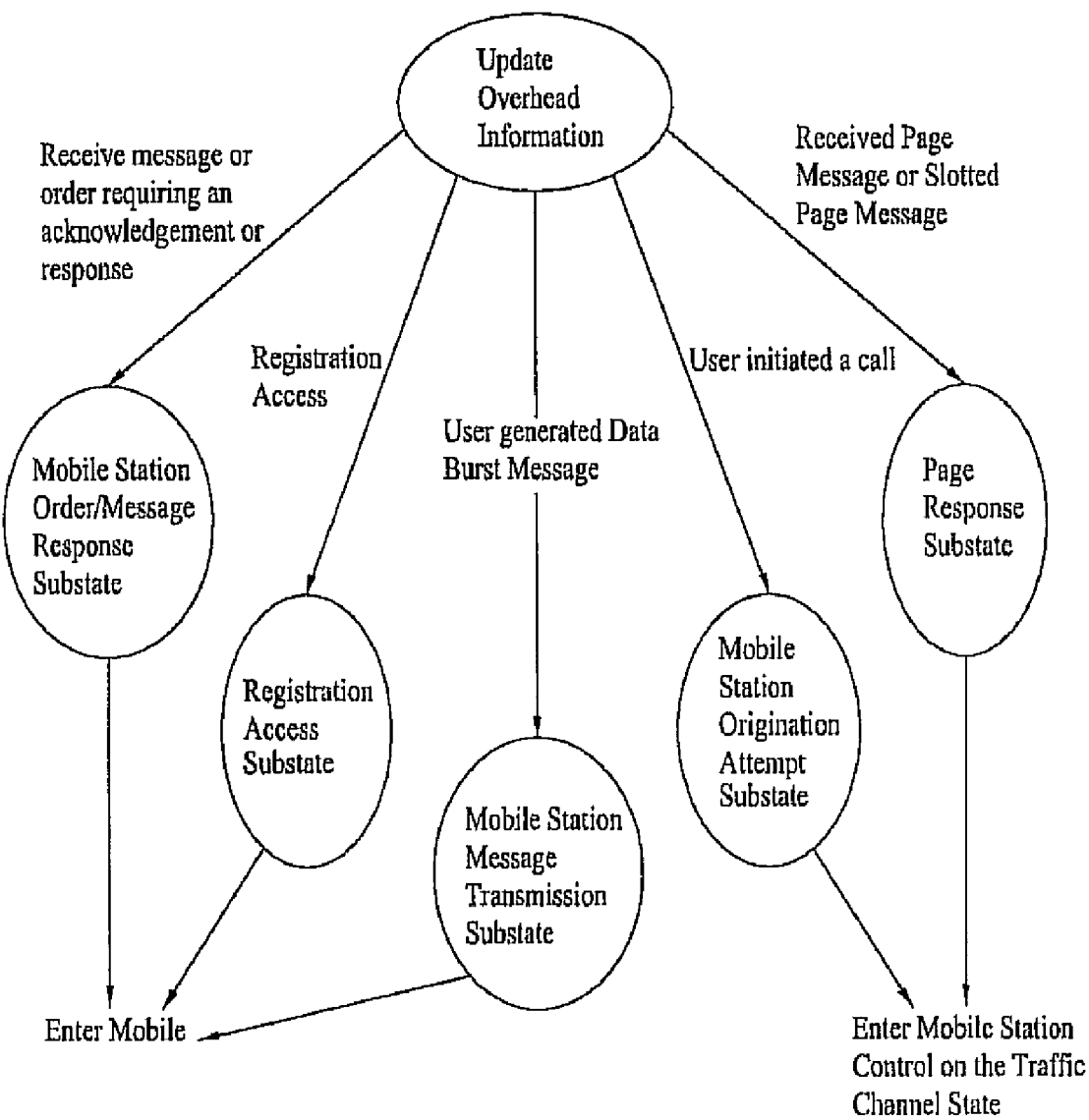
FIG. 6 illustrates the cdma2000 system access state.

FIG. 6 illustrates the System Access state. The first step in the system access process is to update overhead information to ensure that the MS 2 is using the correct access channel parameters, such as initial power level and power step increments. A MS 2 randomly selects an access channel and transmits without coordination with the BS 6 or other MS. Such a random access procedure can result in collisions. Several steps can be taken to reduce the likelihood of collision, such as use of a slotted structure, use of a multiple access channel, transmitting at random start times and employing congestion control, for example, overload classes.

The MS 2 may send either a request or a response message on the access channel. A request is a message sent autonomously, such as an Origination message. A response is a message sent in response to a message received from the BS 6. For example, a Page Response message is a response to a General Page message or a Universal message.

The Multiplexing and QoS Control sublayer 34 has both a transmitting function and a receiving function. The transmitting function combines information from various sources, such as Data Services 61, Signaling Services 63 or Voice Services 62, and forms Physical layer SDUs and PDCHCF SDUs for transmission. The receiving function separates the information contained in Physical Layer 21 and PDCHCF SDUs and directs the information to the correct entity, such as Data Services 61, Upper Layer Signaling 63 or Voice Services 62.

The Multiplexing and QoS Control sublayer 34 operates in time synchronization with the Physical Layer 21. If the Physical Layer 21 is transmitting with a non-zero frame offset, the Multiplexing and QoS Control sublayer 34 delivers Physical Layer SDUs for transmission by the Physical Layer at the appropriate frame offset from system time.

The Multiplexing and QoS Control sublayer 34 delivers a Physical Layer 21 SDU to the Physical Layer using a physical-channel specific service interface set of primitives. The Physical Layer 21 delivers a Physical Layer SDU to the Multiplexing and QoS Control sublayer 34 using a physical channel specific Receive Indication service interface operation.

The SRBP Sublayer 35 includes the sync channel, forward common control channel, broadcast control channel, paging channel and access channel procedures.

The LAC Sublayer 32 provides services to Layer 3 60. SDUs are passed between Layer 3 60 and the LAC Sublayer 32. The LAC Sublayer 32 provides the proper encapsulation of the SDUs into LAC PDUs, which are subject to segmentation and reassembly and are transferred as encapsulated PDU fragments to the MAC Sublayer 31.

Processing within the LAC Sublayer 32 is done sequentially, with processing entities passing the partially formed LAC PDU to each other in a well-established order. SDUs and PDUs are processed and transferred along functional paths, without the need for the upper layers to be aware of the radio characteristics of the physical channels. However, the upper layers could be aware of the characteristics of the physical channels and may direct Layer 2 30 to use certain physical channels for the transmission of certain PDUs.

A 1xEV-DO system is optimized for packet data service and characterized by a single 1.25 MHz carrier ("1x") for data only or data Optimized ("DO"). Furthermore, there is a peak data rate of 2.4 Mbps or 3.072 Mbps on the forward Link and 153.6 Kbps or 1.8432 Mbps on the reverse Link. Moreover, a 1xEV-DO system provides separated frequency bands and internetworking with a 1x System. Figure illustrates a comparison of cdma2000 for a 1x system and a 1xEV-DO system.

In CDMA2000, there are concurrent services, whereby voice and data are transmitted together at a maximum data rate of 614.4 kbps and 307.2 kbps in practice. An MS 2 communicates with the MSC 5 for voice calls and with the PDSN 12 for data calls. A cdma2000 system is characterized by a fixed rate with variable power with a Walsh-code separated forward traffic channel.

In a 1xEV-DO system, the maximum data rate is 2.4 Mbps or 3.072 Mbps and there is no communication with the circuit-switched core network 7. A 1xEV-DO system is characterized by fixed power and a variable rate with a single forward channel that is time division multiplexed.

Figure 8:
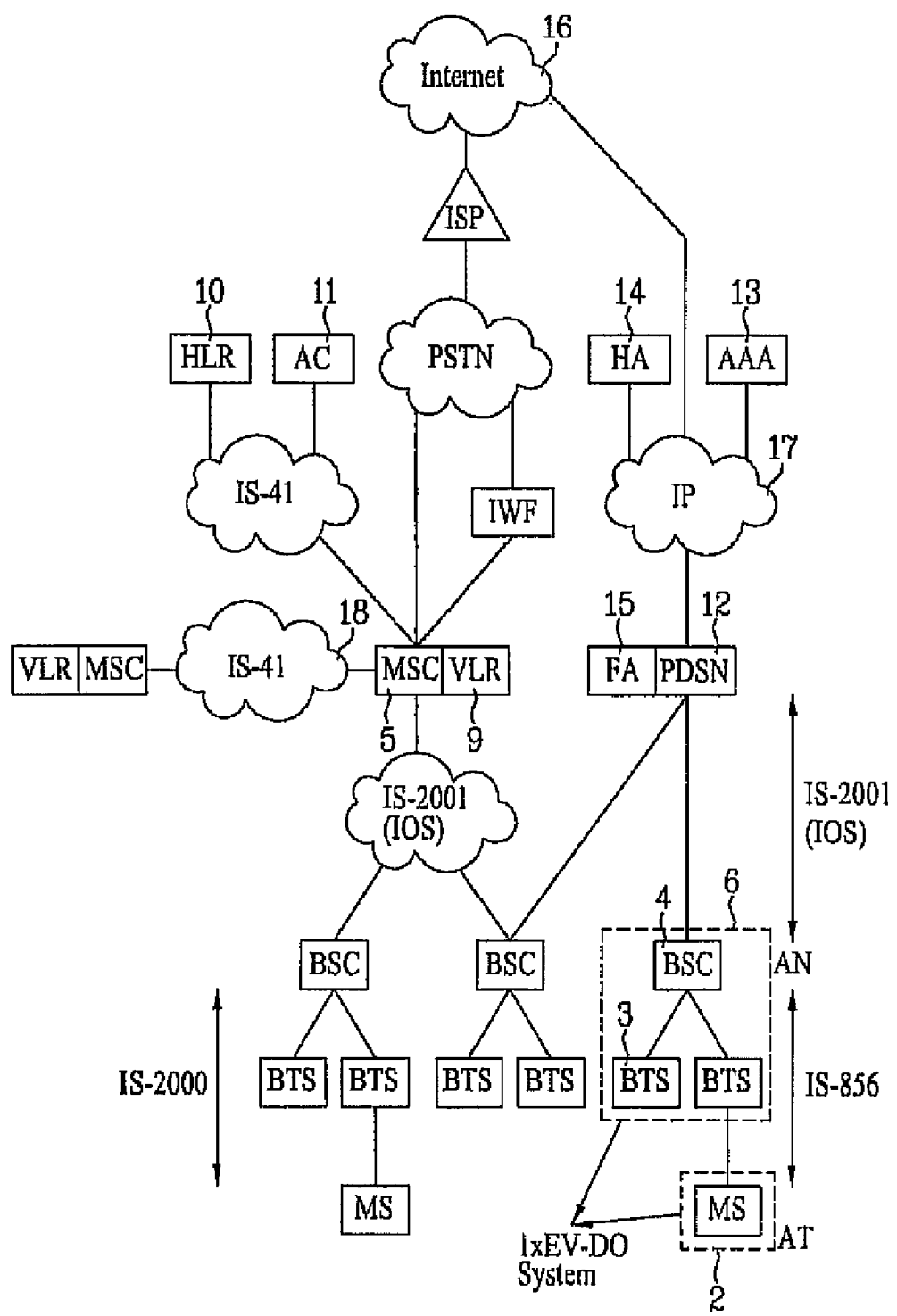
FIG. 8 illustrates a 1xEV-DO system architecture.

FIG. 8 illustrates a 1xEV-DO system architecture. In a 1xEV-DO system, a frame consists of 16 slots, with 600 slots/see, and has a duration of 26.67 ms, or 32,768 chips. A single slot is 1.6667 ms long and has 2048 chips. A control/traffic channel has 1600 chips in a slot a pilot channel has 192 chips in a slot and a MAC channel has 256 chips in a slot. A 1xEV-DO system facilitates simpler and faster channel estimation and time synchronization.

Figure 9:
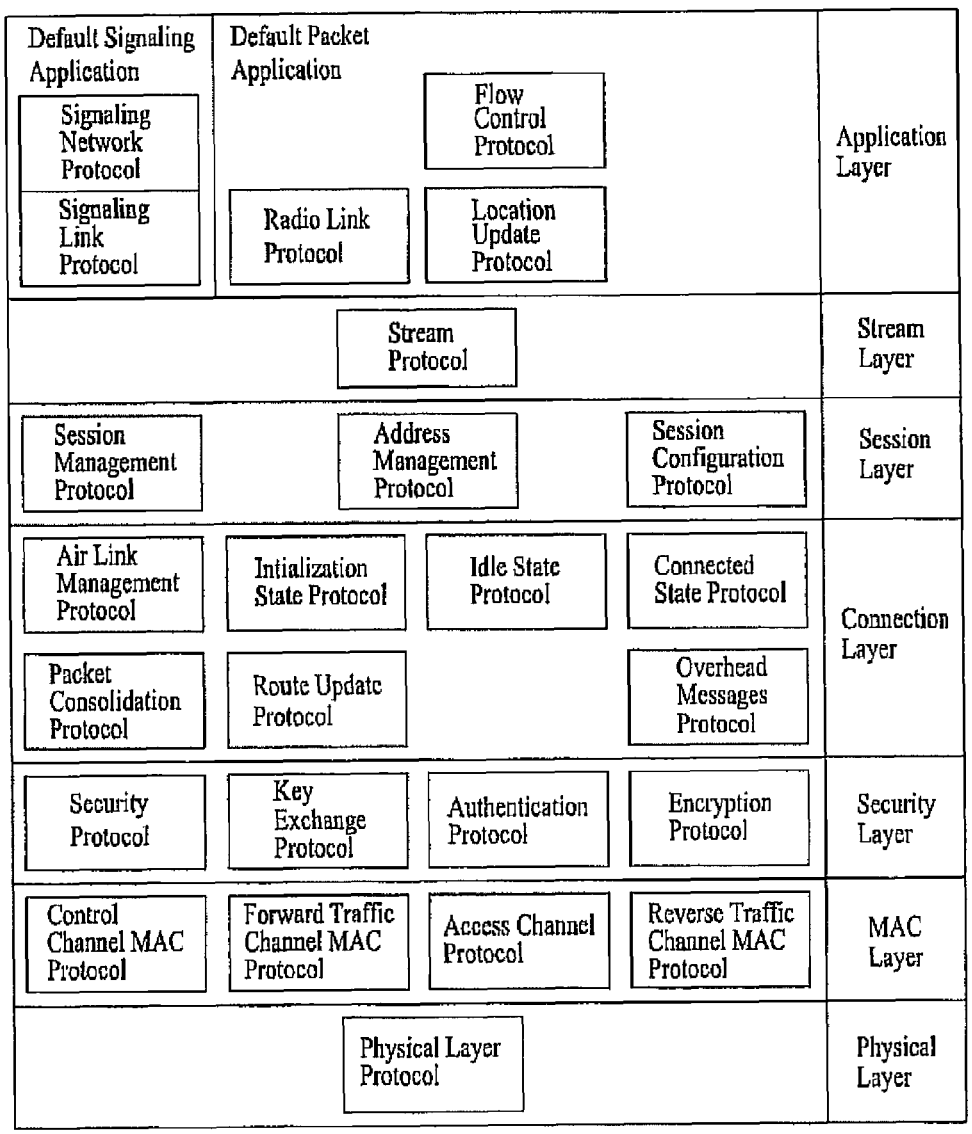
FIG. 9 illustrates 1xEV-DO default protocol architecture.
Figure 10:
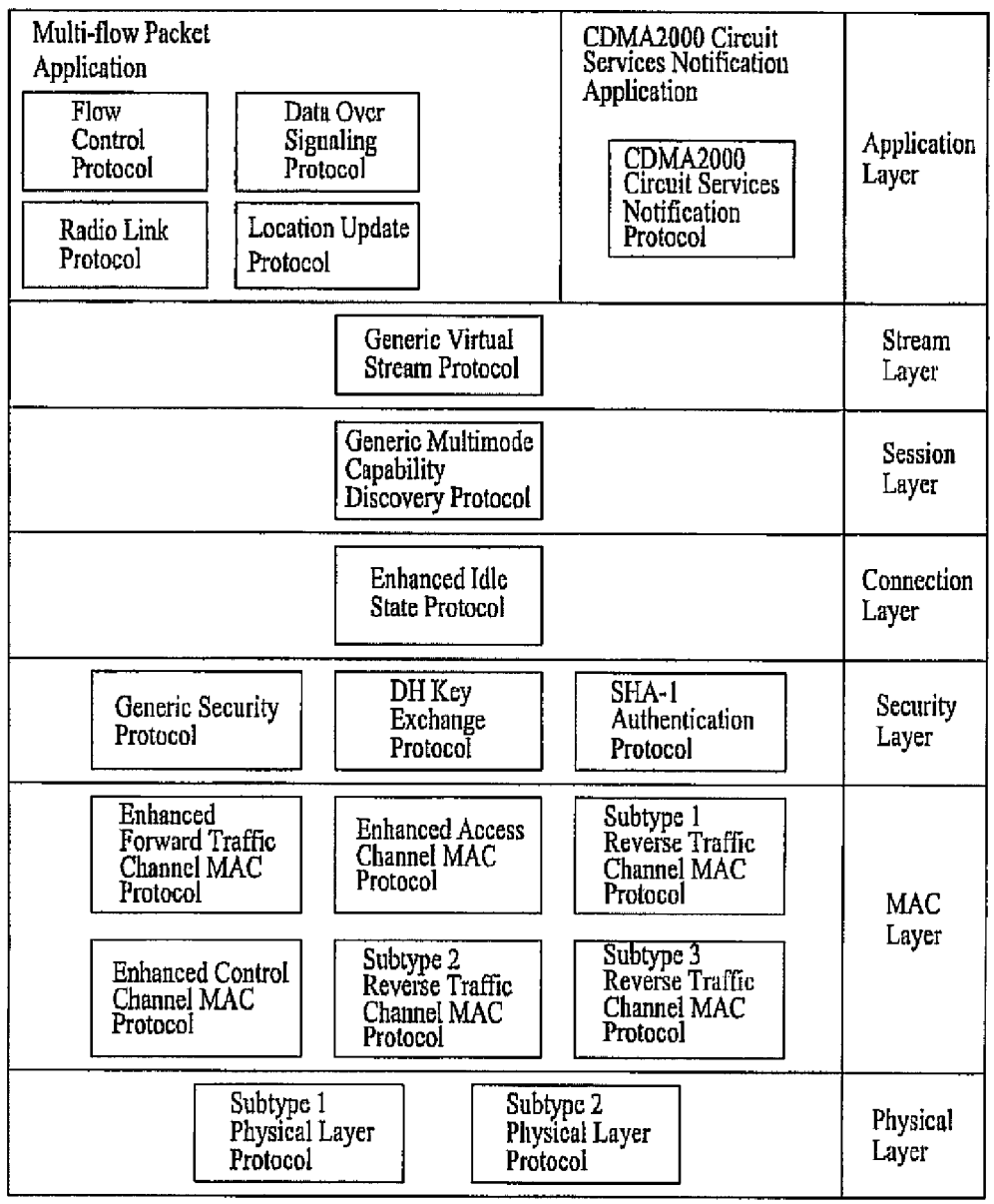
FIG. 10 illustrates 1xEV-DO non-default protocol architecture.

FIG. 9 illustrates a 1xEV-DO default protocol architecture. FIG. 10 illustrates a 1xEV-DO non-default protocol architecture.

Information related to a session in a 1xEV-DO system includes a set of protocols used by an MS 2, or access terminal (AT), and a BS 6, or access network (AN), over an airlink, a Unicast Access Terminal Identifier (UATI), configuration of the protocols used by the AT and AN over the airlink and an estimate of the current AT location.

The Application Layer provides best effort, whereby the message is sent once, and reliable delivery, whereby the message can be retransmitted one or more times. The stream layer provides the ability to multiplex up to 4 (default) or 255 (non-default) application streams for one AT 2.

The Session Layer ensures the session is still valid and manages closing of session, specifies procedures for the initial UATI assignment, maintains AT addresses and negotiates/provisions the protocols used during the session and the configuration parameters for these protocols.

Figure 11:
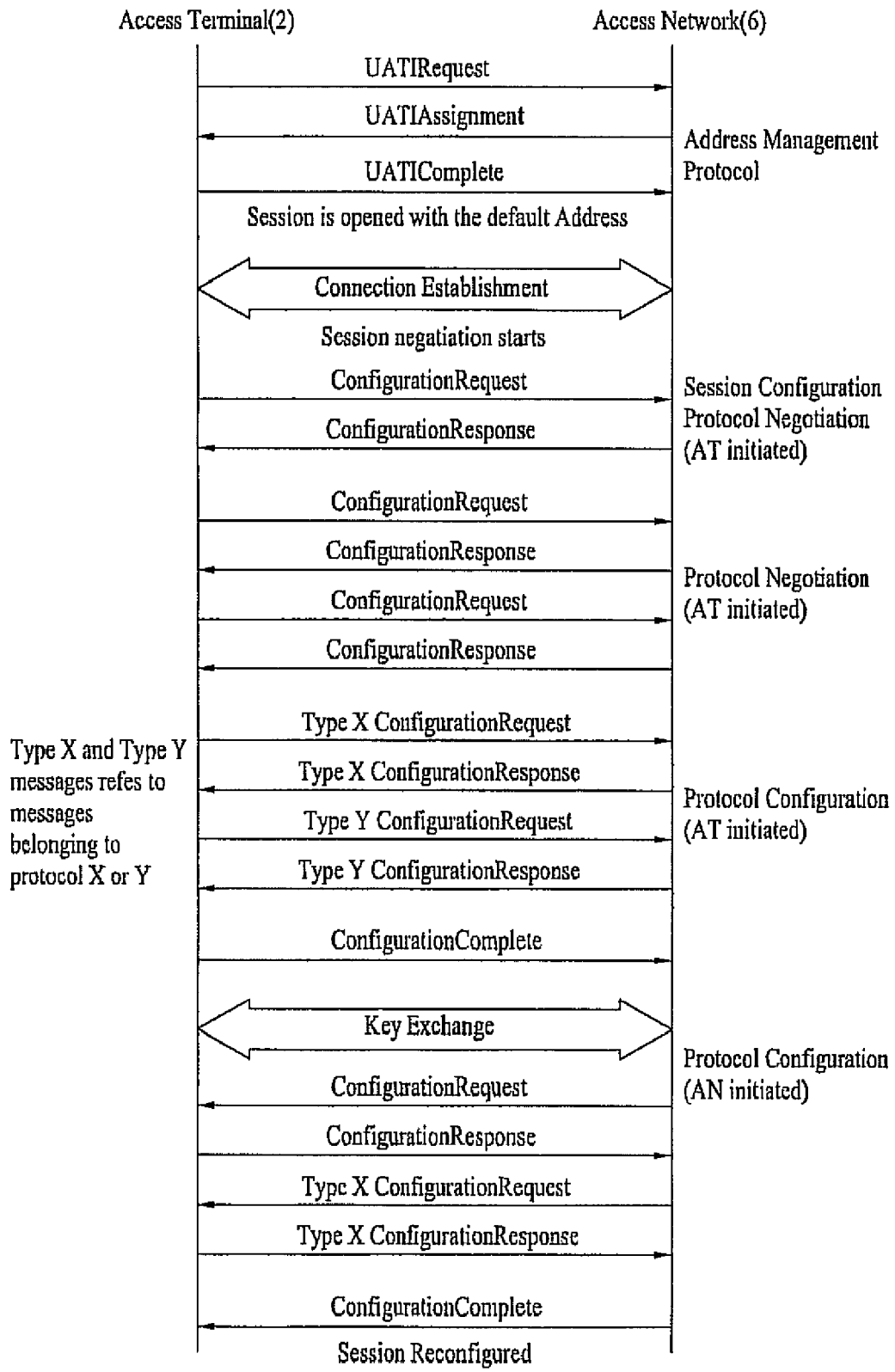
FIG. 11 illustrates 1xEV-DO session establishment.
Figure 14:
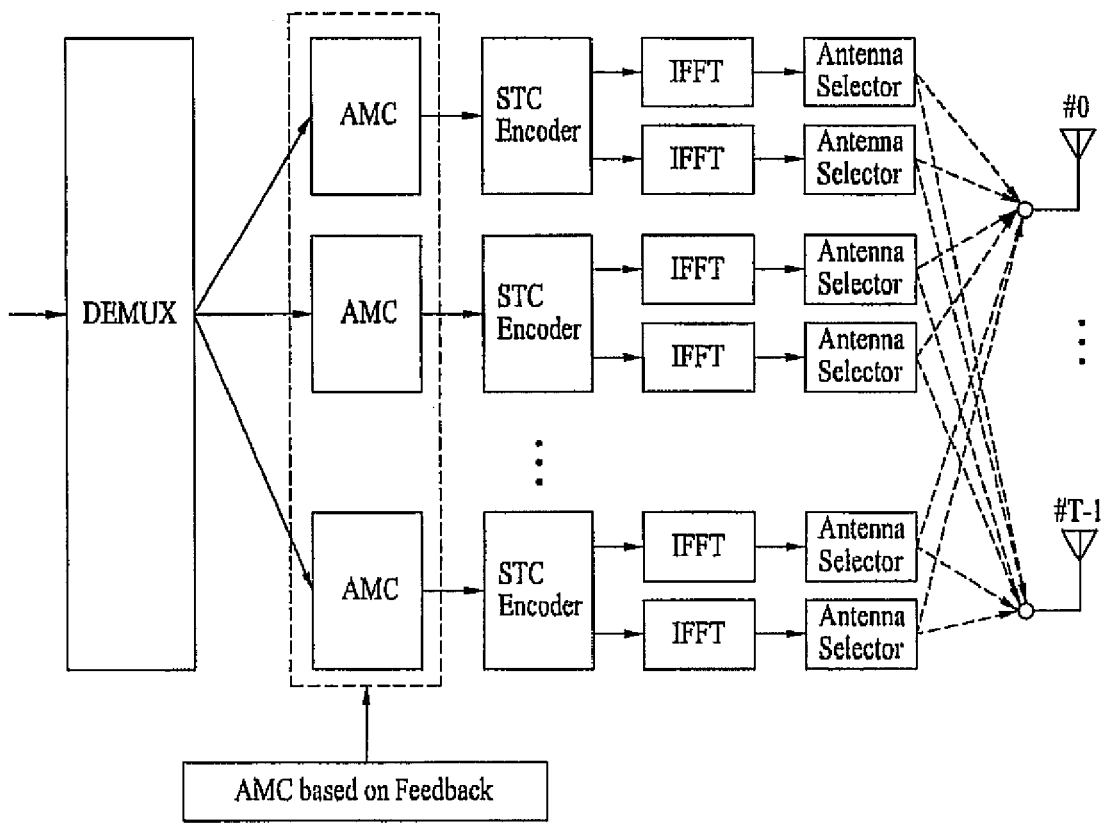
FIG. 14 is another exemplary diagram illustrating transmit diversity combined with antenna selection.

FIG. 11 illustrates the establishment of a 1xEV-DO session. As illustrated in FIG. 14, establishing a session includes address configuration, connection establishment, session configuration and exchange keys.

Address configuration refers to an Address Management protocol assigning a UATI and Subnet mask. Connection establishment refers to Connection Layer Protocols setting up a radio link. Session configuration refers to a Session Configuration Protocol configuring all protocols. Exchange key refers a Key Exchange protocol in the Security Layer setting up keys for authentication.

A "session' refers to the logical communication link between the AT 2 and the RNC, which remains open for hours, with a default of 54 hours. A session lasts until the PPP session is active as well. Session information is controlled and maintained by the RNC in the AN 6.

When a connection is opened, the AT 2 can be assigned the forward traffic channel and is assigned a reverse traffic channel and reverse power control channel. Multiple connections may occur during single session.

The Connection Layer manages initial acquisition of the network and communications. Furthermore, the Connection Layer maintains an approximate AT 2 location and manages a radio link between the AT 2 and the AN 6. Moreover, the Connection Layer performs supervision, prioritizes and encapsulates transmitted data received from the Session Layer, forwards the prioritized data to the Security Layer and decapsulates data received from the Security Layer and forwards it to the Session Layer.

Figure 12:
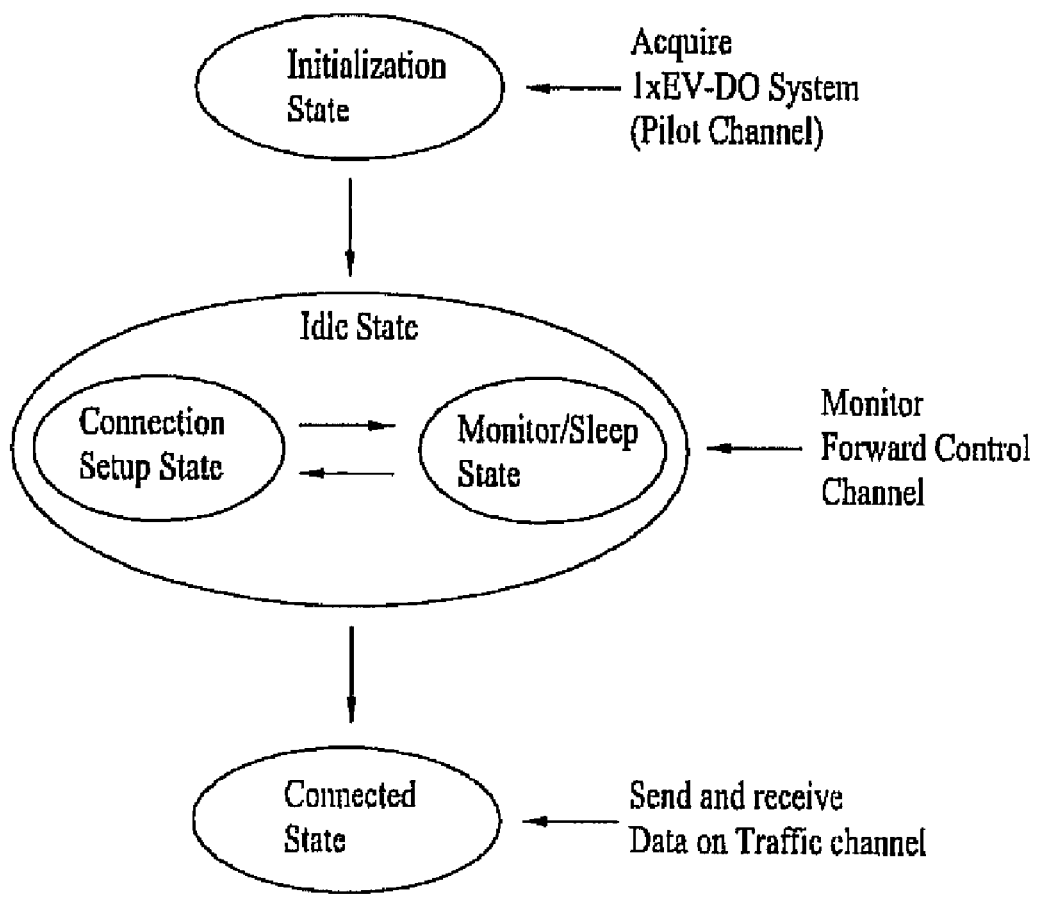
FIG. 12 illustrates 1xEV-DO connection layer protocols.

FIG. 12 illustrates Connection Layer Protocols. As illustrated in FIG. 12, the protocols include an Initialization State, an Idle State and a Connected State.

In the Initialization State, the AT 2 acquires the AN 6 and activates the initialization State Protocol. In the Idle State, a closed connection is initiated and the Idle State Protocol is activated. In the Connected State, an open connection is initiated and the Connected State Protocol is activated.

A closed connection refers to a state where the AT 2 is not assigned any dedicated air-link resources and communications between the AT and AN 6 are conducted over the access channel and the control channel. An open connection refers to a state where the AT 2 can be assigned the forward traffic channel, is assigned a reverse power control channel and a reverse traffic channel and communication between the AT 2 and AN 6 is conducted over these assigned channels as well as over the control channel.

The Initialization State Protocol performs actions associated with acquiring an AN 6. The Idle State Protocol performs actions associated with an AT 2 that has acquired an AN 6, but does not have an open connection, such as keeping track of the AT location using a Route Update Protocol. The Connected State Protocol performs actions associated with an AT 2 that has an open connection, such as managing the radio link between the AT and AN 6 and managing the procedures leading to a closed connection. The Route Update Protocol performs actions associated with keeping track of the AT 2 location and maintaining the radio link between the AT and AN 6. The Overhead Message Protocol broadcasts essential parameters, such as QuickConfig, SectorParameters and AccessParameters message, over the control channel. The Packet Consolidation Protocol consolidates and prioritizes packets for transmission as a function of their assigned priority and the target channel as well as providing packet de-multiplexing on the receiver.

The Security Layer includes a key exchange function, authentication function and encryption function. The key exchange function provides the procedures followed by the AN 2 and AT 6 for authenticating traffic. The authentication function provides the procedures followed by the AN 2 and AT 6 to exchange security keys for authentication and encryption. The encryption function provides the procedures followed by the AN 2 and AT 6 for encrypting traffic.

The 1xEV-DO forward Link is characterized in that no power control and no soft handoff is supported. The AN 6 transmits at constant power and the AT 2 requests variable rates on the forward Link. Because different users may transmit at different times in TDM, it is difficult to implement diversity transmission from different BS's 6 that are intended for a single user.

In the MAC Layer, two types of messages originated from higher layers are transported across the physical layer, specifically a User data message and a signaling message. Two protocols are used to process the two types of messages, specifically a forward traffic channel MAC Protocol for the User data message and a control channel MAC Protocol, for the signaling message.

The Physical Layer is characterized by a spreading rate of 1.2288 Mcps, a frame consisting of 16 slots and 26.67 ms, with a slot of 1.67 ms and 2048 chips. The forward Link channel includes a pilot channel, a forward traffic channel or control channel and a MAC channel.

The pilot channel is similar to the to the cdma2000 pilot channel in that it comprises all "0" information bits and Walsh-spreading with W0 with 192 chips for a slot.

The forward traffic channel is characterized by a data rate that varies from 38.4 kbps to 2.4576 Mbps or from 4.8 kbps to 3.072 Mbps. Physical Layer packets can be transmitted in 1 to 16 slots and the transmit slots use 4-slot interlacing when more than one slot is allocated. If ACK is received on the reverse Link ACK channel before all of the allocated slots have been transmitted, the remaining slots shall not be transmitted.

The control channel is similar to the sync channel and paging channel in cdma2000. The control channel is characterized by a period of 256 slots or 427.52 ms, a Physical Layer packet length of 1024 bits or 128, 256, 512 and 1024 bits and a data rate of 38.4 kbps or 76.8 kbps or 19.2 kbps, 38.4 kbps or 76.8 kbps.

The 1xEV-DO reverse link is characterized in that the AN 6 can power control the reverse Link by using reverse power control and more than one AN can receive the AT's 2 transmission via soft handoff. Furthermore, there is no TDM on the reverse Link, which is channelized by Walsh code using a long PN code.

An access channel is used by the AT 2 to initiate communication with the AN 6 or to respond to an AT directed message. Access channels include a pilot channel and a data channel.

An AT 2 sends a series of access probes on the access channel until a response is received from the AN 6 or a timer expires. An access probe includes a preamble and one or more access channel Physical Layer packets. The basic data rate of the access channel is 9.6 kbps, with higher data rates of 19.2 kbps and 38.4 kbps available.

When more that one AT 2 is paged using the same Control channel packet, Access Probes may be transmitted at the same time and packet collisions are possible. The problem can be more serious when the ATs 2 are co-located, are in a group call or have similar propagation delays.

Multiple input, multiple output (MIMO) refers to the use of multiple antennas at the transmitter and the receiver for improved performance. When two transmitters and two or more receivers are used, for example, two simultaneous data streams can be sent, which double the data rate.

In MIMO, two operations mode can be assumed based on the availability of channel status information at the transmitter side—open-loop and closed-loop operations. In the open-loop operation, channel information is not assumed. Albeit simplicity of the operation, due to lack of channel status information, open-loop operation can incur performance loss.

Different from the open-loop operation, in the closed-loop operation, partial or full channel status information can be assumed.

The operations of MIMO transmission often require overhead transmission from all antennas involved. As a result, resources (e.g., power) can be wasted and throughput can be affected due to interference(s) intended for other users.

In order to promote improved performance in both the open-loop and the closed-loop operations in the MIMO systems, transmission of overhead can be modified. In other words, transmission of overhead (e.g., preamble, a medium access control (MAC), and/or pilot in 1xEV-DO) can be reduced. Consequently, transmission power can be used more effectively and efficiently as well as interference leading to throughput increase can be reduced.

Figure 13:
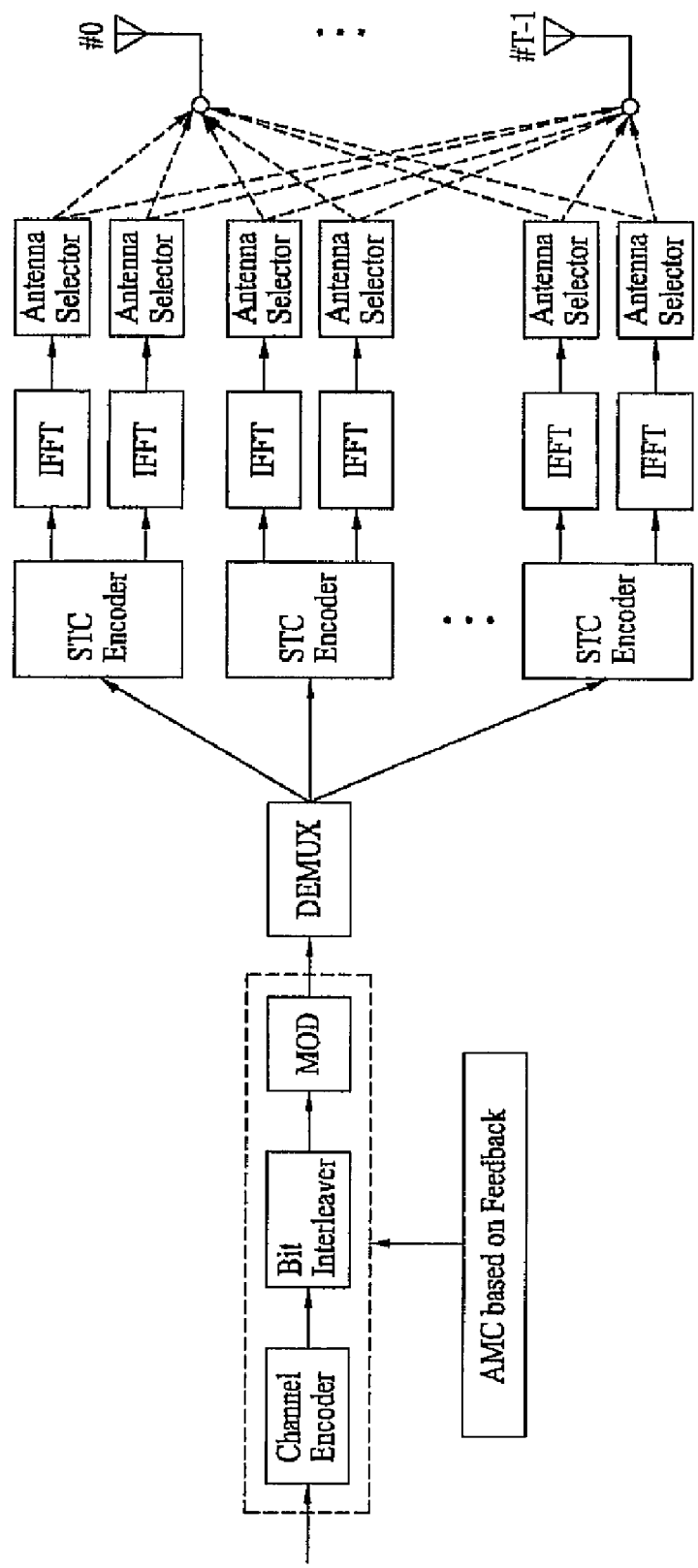
FIG. 13 illustrates an exemplary diagram of a multiple antenna transmission architecture.

FIG. 13 illustrates an exemplary diagram of a multiple antenna transmission architecture. More specifically, FIG. 13 is an architecture for transmit diversity with antenna selection. Referring to FIG. 13, data stream is encoded based on feedback information provided from the receiving side. More specifically, based on the feedback information, the data is processed using an adaptive modulation and coding (AMC) scheme at the transmitting end. The data processed according to the AMC scheme is channel coded, interleaved, and then modulated into symbols (which can also be referred to as coded or modulated data stream).

The symbols are then demultiplexed to multiple STC encoder blocks. Here, demultiplexing is based on the code rate and modulation that the carrier can support. Each STC encoder block encodes the symbols and outputs to encoded symbols to inverse fast Fourier transform (IFFT) block(s). The IFFT block transforms the encoded symbols. The transformed symbols are then assigned to antennas selected by antenna selector(s) for transmission to the receiving end. The selection as to which antenna to be used for transmission can be based on the feedback information.

FIG. 14 is another exemplary diagram illustrating transmit diversity combined with antenna selection. Different from FIG. 13 which is designed for a single codeword (SWC) operation, in FIG. 14, adaptive modulation and coding is performed per carrier basis and is designed for a multiple codeword (MWC) operation.

According to FIGS. 13 and 14, the data is processed by the STC encoders before being processed by the IFFT block(s). However, it is possible for the data to be processed by the IFFT block before being processed by the STC encoder blocks. In short, the processing order between the STC encoders and the IFFT blocks can be switched.

In detail, the feedback information from the receiving end can be used in performing channel coding and modulation (or in executing the AMC scheme) to the data stream. This AMC scheme process is illustrated in a dotted box. The feedback information used in channel coding and modulation can be a data rate control (DRC) or a channel quality indicator (CQI), for example. Further, the feedback information can include various information such as sector identification, carrier/frequency index, antenna index, supportable CQI value, best antenna combination, selected antennas, and a supportable signal-to-interference noise ratio (SINR) for a given assigned multi-carriers.

The information related to selected antennas as well as its supportable SINR can be transmitted through a channel from the receiving end to the transmitting end (e.g., reverse link) or on a different channel. Such a channel can be a physical channel or a logical channel. Further, the information related to the selected antennas can be transmitted in a form of a bitmap. The position of each bitmap represents the antenna index.

The DRC or the CQI, for example, can be measured per transmit antenna. As an example of the CQI, a transmitting end can send signal (e.g., pilot) to a receiving end to determine the quality of the channel(s) through which the signal was sent. Each antenna transmits its own pilot for the receiving end to extract the channel information from the antenna element to the receiving end. The transmitting end can also be referred to as an access node, base station, network, or Node B. Moreover, the receiving end can also be referred to as an access terminal, mobile terminal, mobile station, or mobile terminal station. In response to the signal from the transmitting end, the receiving end can send to the transmitting end the CQI to provide the channel status or channel condition of the channel through which the signal was sent.

Furthermore, the feedback information (e.g., DRC or CQI) can be measured using a pre-detection scheme or a post-detection scheme. The pre-detection scheme includes inserting antenna-specific known pilot sequence before an orthogonal frequency division multiplexing (OFDM) block using a time division multiplexing (TDM). The post-detection scheme involves using antenna-specific known pilot pattern in OFDM transmission.

Further, the feedback information is based on each bandwidth or put differently, the feedback information includes the channel status information on each of N number of 1.25 MHz, 5 MHz, or a sub-band of OFDM bandwidth.

As discussed, the symbols processed using the AMC scheme are demultiplexed to multiple STC encoder blocks. The STC encoder blocks can implement various types of coding techniques. For example, the encoder block can be a STC encoder. Each STC encoder can have a basic unit of MHz. In fact, in FIG. 16, the STC encoder covers 1.25 MHz. Other types of coding techniques include space-time block code (STBC), non-orthogonal STBC (NO-STBC), space-time Trellis coding (STTC), space-frequency block code (SFBC), space-time frequency block code (STFBC), cyclic shift diversity, cyclic delay diversity (CDD), Alamouti, and precoding.

As discussed, the IFFT transformed symbols are assigned to specific antenna(s) by the antenna selectors based on the feedback information. That is, in FIG. 16, the antenna selector chooses the pair of antenna corresponding to two outputs from the STC encoder specified in the feedback information.

The antenna selectors select the antennas for transmitting specific symbols. At the same time, the antenna selector can choose the carrier (or frequency bandwidth) through which the symbols are transmitted. The antenna selection as well as frequency selection is based on the feedback information which is provided per each bandwidth of operation. Furthermore, the wireless system in which antenna and frequency allocation is made can be a multi input, multi output (MIMO) system.

In the MIMO system having multiple antennas, the antennas for transmitting data can be classified as primary antenna(s) and secondary antenna(s). The primary antenna(s) can be defined by the antenna(s) that provides best reception quality or the antenna(s) with the smallest index among the antennas involved in the transmission.

Figure 15:
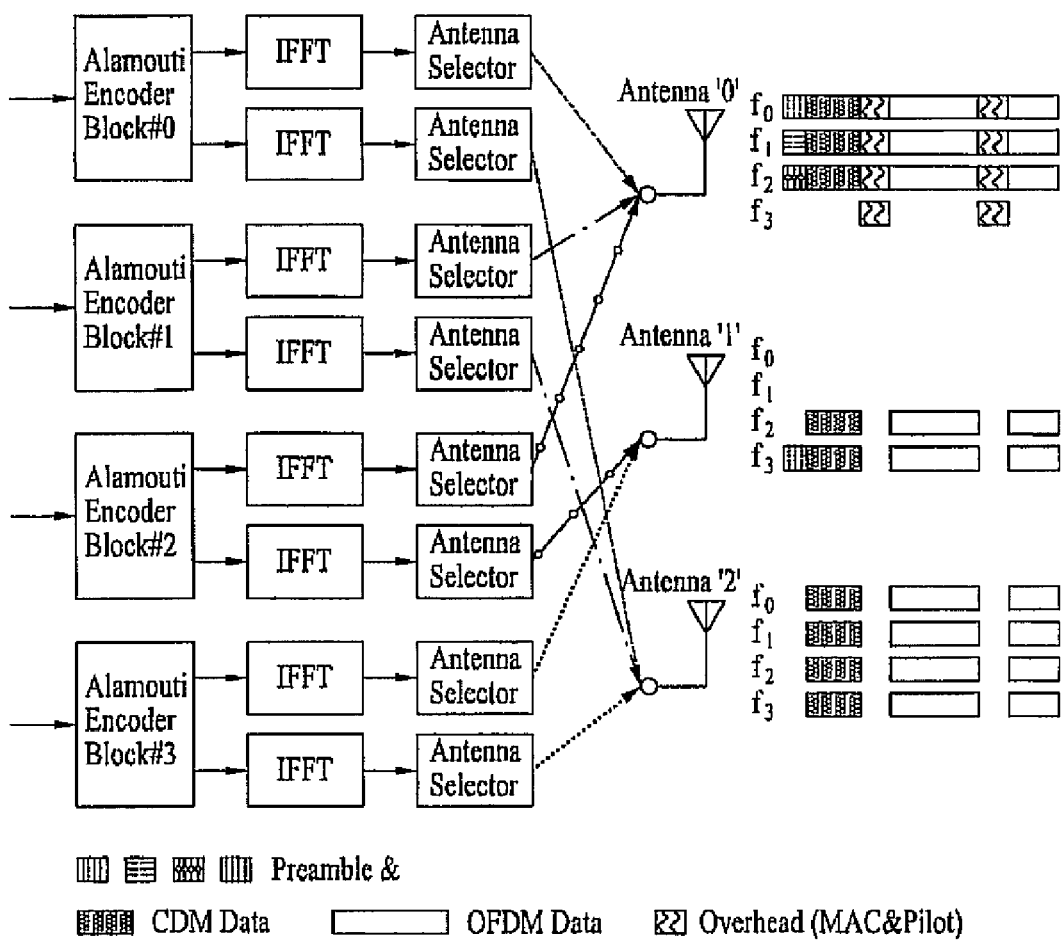
FIG. 15 is an exemplary diagram illustrating overhead reduction transmission.

FIG. 15 is an exemplary diagram illustrating overhead reduction transmission. Here, a single antenna (also referred to as a primary antenna) is used to carry the overhead information. As discussed, the primary antenna can be selected based on criteria. That is, the antenna having the best channel condition or the antenna having the smallest index can be selected as the primary antenna.

The primary antenna can be used to carry (or transmit) the preamble. The preamble can include information on the data packet. Moreover, the primary antenna can be used to carry the overhead information which can include pilot and medium access control (MAC). In addition, the primary antenna can be used to transmit data including the code division multiplex (CDM) data and the OFDM data. Furthermore, any retransmission of the preambles is transmitted via the primary antenna.

The antenna not selected as the primary antenna or having less-than-best channel condition and/or not the smallest index can be selected as secondary antenna. The secondary antenna can be used to transmit only the data (e.g., CDM data and OFDM data). Unlike the primary antenna, the secondary antenna does not transmit the preambles nor the overhead information. The overhead information is transmitted via the primary antenna so as to support legacy access terminals (ATs) and/or new ATs. Here, support of the legacy AT can be referred to as transmission of CDM data, and the new AT can be referred to as transmission of the OFDM data.

The transmission of the preambles (e.g., legacy preamble) and the legacy data (e.g., CDM data) usually take place in a sub-slot (or a quarter slot). The sub-slot usually has a duration of 400 chips, and often, a portion of the 400 chips are occupied by the preamble while the remaining portion of the 400 chips are occupied by the data.

Referring to FIG. 15, Antenna '0' and Antenna '2' are selected for transmitting data on carriers 0 and 1. Moreover, Antenna '0' and Antenna '1' are selected for transmitting data on carrier 2, and Antenna '1' and Antenna '2' are selected for transmitting data on carrier 3. Hence, Antenna '0' is the primary antenna for carriers 0, 1, and 2, and Antenna '1' is the primary antenna for carrier 3.

As discussed, the selection of the primary antenna can be based on the reception quality. That is, the primary antenna can be defined as the antenna that provides the best reception quality. Alternatively, the selection of the primary antenna can be based on the smallest index among the antennas involved in the transmission such as in the case of more than one antenna selection-based transmission, spatial multiplexing, and transmit diversity-based transmission.

Preamble can be transmitted over carriers via one antenna or multiple antennas. More specifically, in FIG. 15, the preamble is transmitted using the first portion of the basic transmission unit. For example, in 1xEV-DO, basic unit is slot with duration of 1.667 ms and the first portion is ¼ slot with the duration of 400 chips (duration of each chip is $1/1.2288$ μs). Preamble transmission takes place using the portion of ¼ slot.

In FIG. 15, the preambles from Blocks #0, #1, and #2 are transmitted on carriers 0, 1, and 2 (also indicated as $f_0$, $f_1$, and $f_2$). Moreover, the preamble from Block #3 is transmitted on carrier 3 (also indicated as $f_3$). Since Antenna '0' is the primary antenna for carriers 0, 1, and 2, and Antenna '1' is the primary antenna for carrier 3, the preambles are transmitted accordingly using the first portion of respective slots. Furthermore, retransmissions of the preambles are made via the primary antenna(s) only.

Further to transmission in ¼ slot (or sub-slot) of the preamble and the CDM data, the preamble can also be transmitted with an orthogonal frequency division multiplexing (OFDM) data. As discussed, FIG. 15 shows the example transmission assuming preamble+CDM data transmission in ¼ slot.

According to the embodiment of FIG. 15, transmission(s) and/or retransmission(s) of overhead information are transmitted using only the primary antenna. The overhead can include a preamble for user identification or channel type (e.g., data or control channel), medium access control (MAC), and pilot as in 1xEV-DO. In addition, the overhead including pilot and medium access control (MAC) can be made through the primary antenna so as to support legacy access terminals (ATs) and/or new ATs.

Figure 16:
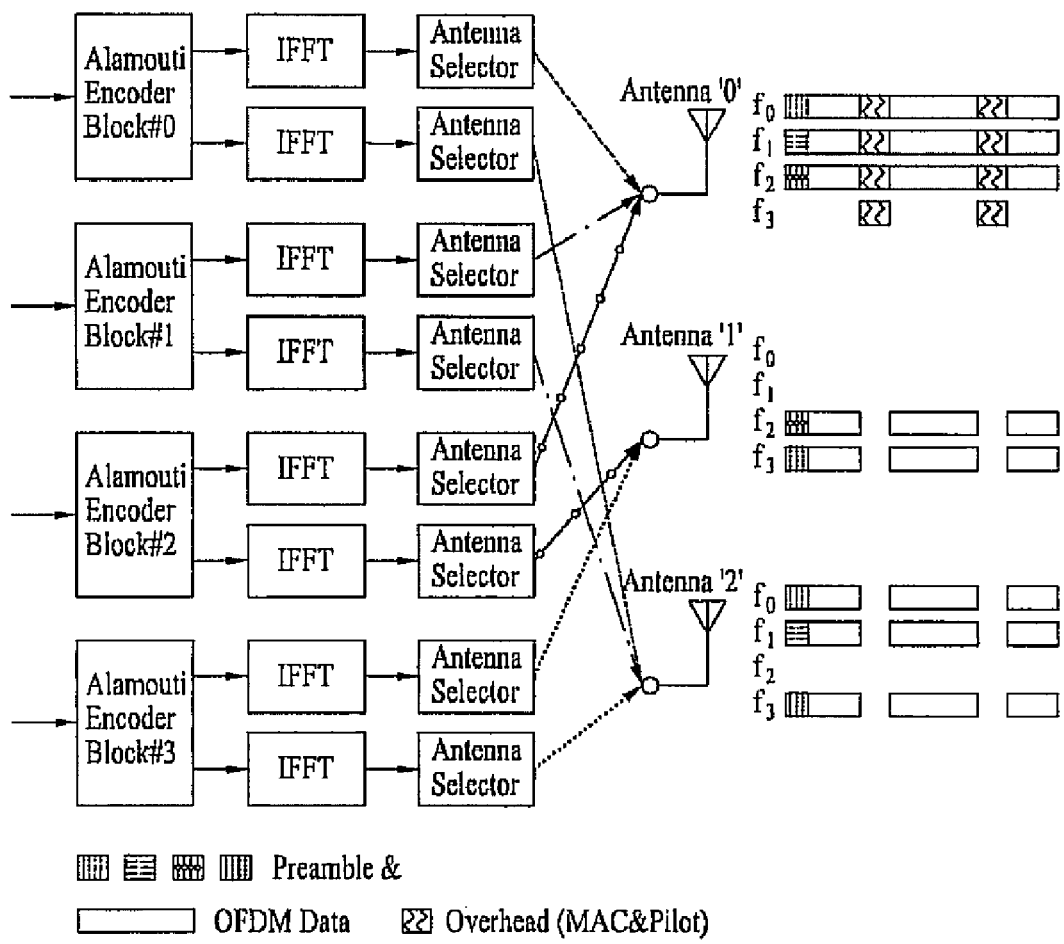
FIG. 16 is an exemplary diagram illustrating transmission assuming preamble and OFDM data transmission.

Data can be transmitted through both the primary and second antennas, as illustrated in FIG. 16. Here, the data transmission antenna-specific pilot signals can be transmitted to help new ATs estimate the channel from each antenna.

FIG. 16 is an exemplary diagram illustrating transmission assuming preamble and OFDM data transmission. More specifically, FIG. 16 illustrates transmission of preamble and OFDM data in the ¼ transmission slot.

As discussed, the primary antenna and the secondary antenna can be selected based on channel condition and/or size of the index. It is possible in multiple antenna situations to have more than one secondary antenna.

Referring to FIG. 16, transmission of the overhead, including pilot and MAC, is made by Antenna '0' for backward compatibility support. If, however, backward compatibility can be ignored or is no longer an issue, then only the preamble can be fixed and/or sent by a fixed antenna (e.g., Antenna '0'). Even if backward compatibility is no longer an issue, the preamble can be sent by each carrier having the best channel condition. However, there can be signaling problem based on condition, and therefore, it is better to fix or select the antenna for transmission for improved reliability.

The preamble is assumed to be transmitted using some assigned sub-carrier(s). In FIG. 16, both primary and secondary antennas can be used to transmit the preambles, but the MAC and pilot are transmitted using only primary antenna.

As discussed, the preambles can be sent by only one antenna. For example, the primary antenna (e.g., Antenna '0') can be used to transmit the preambles. In other words, Antenna '0' can be selected for transmitting data on carriers 0, 1, 2, and 3. Hence, Antenna '0' is considered the primary antenna.

Further, the preambles can be sent by multiple antennas. For example, FIG. 16 illustrates the preamble being transmitted by all three antennas. That is, the preambles are transmitted via not only the primary antennas but also secondary antennas.

For carrier 0, antennas 0 and 2 are selected. As such, Antenna '0' is the primary antenna and Antenna '2' is the secondary antenna.

Different from a situation where the preambles are transmitted from/by only one antenna, the preambles are transmitted and retransmitted only through the primary antenna. In a situation where the preambles are transmitted from/by multiple antennas, the preambles are not limited to transmission from only the primary antenna but the secondary antenna can be also used.

In short, the preambles of FIG. 16 are transmitted via the primary antennas (e.g., Antenna '0' and Antenna '1'), and any retransmissions of the preambles can only take place via the primary antennas. However, if the preambles are sent by multiple antennas, as illustrated in FIG. 16, both the primary and secondary antennas can be used to transmit the preambles.

FIG. 17 is another exemplary diagram illustrating transmission of preamble and OFDM data. Here, the basic bandwidth is assigned as a whole. That is, different from FIG. 15, multiple of the basic unit of bandwidth (i.e., 1.25 MHz) is assigned as a whole. In other words, the gap(s) between the carriers (or bands) can be eliminated and used as a part of the OFDM data. Moreover, the overhead transmission (e.g., pilot and MAC) can be combined to eliminate the gap(s) between carriers as well.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting data in a multi input, multi output (MIMO) system, the method comprising:
    receiving antenna combination information from a receiving side;
    selecting an antenna having the best channel condition or the smallest index as a primary antenna from a plurality of transmission antennas, wherein the selection is based on the antenna combination information;
    selecting at least one secondary antenna from the plurality of transmission antennas, wherein the at least one secondary antenna is not the same antenna selected as the primary antenna;
    transmitting overhead information via the primary antenna, wherein the overhead information includes at least preamble, medium access control (MAC) or pilot; and
    transmitting only other data via the at least one secondary antenna, wherein the other data does not include the overhead information.

2. The method of claim 1, wherein transmitting the overhead information via the primary antenna comprises transmitting the overhead information with the other data.

3. The method of claim 1, wherein the other data is at least one of code division multiplex (CDM) data and orthogonal frequency division multiplex (OFDM) data.

4. The method of claim 1, wherein the overhead information is transmitted using a first portion of a basic transmission unit.

5. The method of claim 4, wherein the basic transmission unit is a slot with duration of 1.667 ms.

6. The method of claim 4, wherein the first portion is a ¼-slot with duration of 400 chips.

7. The method of claim 6, wherein the ¼-slot includes at least one of a code division multiplex (CDM) preamble, an orthogonal frequency division multiplex (OFDM) preamble, a CDM data, and OFDM data.

8. The method of claim 1, further comprising re-transmitting the overhead information via the primary antenna.

9. The method of claim 1, wherein the MIMO system supports multiple carriers and the primary antenna and the at least one secondary antenna are selected according to a corresponding carrier.

10. The method of claim 1, wherein the overhead information and the other data are assigned to a bandwidth as a whole.

* * * * *